United States Patent Office 3,141,785
Patented July 21, 1964

1

3,141,785
REFRACTORY SHAPES AND METHOD OF MAKING SAME
Ben Davies, Pittsburgh, Pa., assignor to Harbison-Walker Refractories Company, Pittsburgh, Pa., a corporation of Pennsylvania
No Drawing. Filed May 10, 1961, Ser. No. 108,989
6 Claims. (Cl. 106—59)

This invention is concerned with refractories for use in the oxygen converter process.

The oxygen converter process, also variously called the LD process, the Kaldo process, or simply oxygen steelmaking, is a relatively new development in the steel industry which permits the rapid production of good quality steel. Gaseous oxygen is blown onto the surface of the metal within the vessel or converter thereby greatly accelerating the steelmaking reaction. Basic refractories are required for the lining of the vessel as a basic slag is used. The refractories most generally used have been dead burned magnesite, dead burned dolomite or a mixture of these. A tar or pitch has normally been employed as a binder for unburned brick of these compositions. The tar or pitch appears to impart resistance to slag corrosion to the refractory as well as supplying some protection against hydration to the material. This latter function is of particular significance in the case of dolomite which hydrates quite readily in the presence of atmospheric moisture.

These refractories have given such adequate service that the exceptional qualities of the oxygen converter could be viewed on their proper perspective. However, lining life controls the number of heats, and thus the total steel tonnage produced, which can be run before relining becomes necessary. Therefore, research has been conducted towards the manufacture of brick better capable of withstanding the chemical and physical conditions within the converter.

The co-pending application, King et al., Serial No. 38,438, now abandoned in favor of a continuation-in-part application, Serial No. 266,796, describes refractories of a chemistry that is at least 96 weight percent MgO and CaO, exclusive of the bonding agent, with the critical limitation that there be at least 5 percent lime present. Slag tests run in the laboratory, using a sample of the early slag encountered in the oxygen vessel, indicated that the presence of CaO gave a more chemically-resistant brick. These brick have seen considerable service and have been recognized as a forward step in assuring more heats per lining.

The particularly outstanding advantage of the refractories of King et al., Serial No. 38,438, is the resistance to attack by the early slag in the oxygen converter. The $CaO:SiO_2$ ratio of the slag in the oxygen converter changes from about 1.4:1 in the early part of the heat to greater than 2:1 at the end of the heat and the iron oxide content increases from about 10 percent to about 30 percent. The following are typical analyses of the early and late slags:

|  | Early Slag, Percent | Late Slag, Percent |
|---|---|---|
| $SiO_2$ | 32.1 | 18.1 |
| CaO | 40.9 | 36.0 |
| $Fe_2O_3$ | 11.5 | 30.5 |
| MnO | 6.9 | 6.7 |
| MgO | 5.7 | 5.7 |
| $TiO_2$ | 1.4 | 1.4 |
| $P_2O_5$ | 1.5 | 1.5 |

2

By early slag is meant that present after about 5 to 10 minutes of the oxygen blow while late slag means that present towards the last few minutes of the process.

It can be seen that the silica renders the early slag relatively acid and comprises the dominantly corrosive oxide. This slag is extremely fluid and corrosive. It was this slag that King et al., supra, refractories specifically resisted. It was found that the presence of CaO in the refractory assured good resistance to attack by this slag, possibly through suppression of the formation of such materials as monticellite and by promoting dicalcium silicate formation.

As noted above, the late slag differs considerably in its chemistry from the early slag. The silica is greatly reduced while the iron oxide content increases almost threefold. This late slag is also very destructive of basic brick. This slag is rendered more basic by the decrease in silica and the iron oxide becomes the principal corrosive influence as through the formation of low melting calcium ferrites.

It is the primary object of the present invention to provide refractories comprising lime and magnesia having physical properties adapting them for use generally at very high temperatures, which are superior in performance as linings for the oxygen steelmaking processes as compared with the linings previously available, and which are readily prepared by conventional refractory making procedures.

It is a further object of the invention to provide improved refractories that have all the advantages of prior refractories but are further characterized by improved resistance to attack by late slag encountered in oxygen steelmaking.

These and other objects are attained in accordance with this invention by refractories, whether in the form of shapes or as ramming or monolithic materials, comprising, by weight, at least 96 percent of MgO plus CaO plus $Cr_2O_3$, the MgO ranging from 50 to 94 percent, the CaO from 50 to 5 percent and the $Cr_2O_3$ ranging from 1 to 5 percent. The remainder of the refractory will be no more than about 4 percent total, and this usually will be predominantly $SiO_2$, $Al_2O_3$, and $Fe_2O_3$, referred to sometimes hereinafter for brevity as SAF. For use in the oxygen steel process the brick must also contain or be capable of developing residual carbon. For all purposes we prefer at least 97 percent of MgO plus CaO plus $Cr_2O_3$ and less than 3 percent of other materials usually present in such aggregates, for example, SAF. It is not certain what function the chromic oxide performs, but it is believed that it forms refractory solid solutions with iso-structural compounds containing iron oxide. Thus, it is postulated that the chromic oxide replaces some of the iron oxide of the calcium and dicalcium ferrites thereby resulting in a solid solution with a higher liquidus temperature, in the lining in contact with the metal melt.

In refractory practice involving lime, magnesia, and dolomite compositions, the traditional practice consists of first preparing dead burned or sintered grain by firing the individual raw materials to temperatures high enough to stabilize and densify them. These dead burned materials are crushed and ground to form suitably sized aggregates for use in refractory products such as brick and ramming mixes. In making such products, a suitable grading of sizes is thoroughly mixed together, frequently with additives, such as bonds, and then processed into the desired product, for example, brick. In these practices, as in my own, the dead burned grains can represent a single blend mixed together before dead burning, or several constituents can be dead burned separately. Thus, I can dead burn magnesia and dolomite separately, or I can blend them in crude form and then dead burn them together. Similarly, I have found that the chromic oxide addition in which my invention resides can be mixed together with any one or all of the materials to be dead burned. Or, as explained more fully hereinafter, it can be withheld from the materials to be dead burned and later added to the batch for forming the brick or other refractory product.

Refractory compositions and shapes in accordance with this invention are made following practices that are generally well known in the art. Generally, this involves heating the tar or pitch bonding agent to about 100° F. above its softening point, or such other temperature that imparts adequate fluidity to the bonding agent, and then incorporating the dead burned refractory aggregates conforming to the composition stated above. Preferably, these aggregates are divided into a major portion that is a coarse fraction and a minor portion that is a fine fraction. A 60:40 ratio of coarse to fine particles, on a weight basis, is satisfactory. It is desirable to heat the coarse fraction to about the temperature of the bonding agent. After the coarse fraction and the bonding agent are mixed, the remainder of the refractory batch is then added. In case the chromic oxide yielding substances are not previously incorporated in the dead burned grains or aggregates, they can be added at this point in fine ground form. Brick or other refractory shapes then are formed from the batch, as by pressing, extruding or the use of other conventional forming techniques.

Similarly, the types of aggregates and the chromic oxide that can be used in the practice of the invention are well known in the art. It is of course preferred that refractory grain of high density be used to supply the CaO and MgO in instances where the chromic oxide is to be added to the brick mix and not before dead burning. Grain of satisfactory density can be obtained by firing material bearing CaO and MgO, either in admixture or separately. For example, such firing can be accomplished at 2900° F. or higher in a rotary kiln. A particular procedure whereby very high density grain can be produced involves dead buring small dry-formed compressed bodies of CaO and MgO produced upon pressing at a pressure of at least 20,000 p.s.i., and preferably 30,000 p.s.i. or higher. Typically, the compositions are blended to yield a dead burned product containing MgO ranging from 50 to 94 percent and the CaO, ranging from 50 to 5 percent, with CaO and MgO being at least 96 weight percent and the remainder, if any, being the usual residuals such as $SiO_2$, $Al_2O_3$, and $Fe_2O_3$. The components that are used in forming the bodies to be compressed are calcined lime, calcined dolomite, and caustic calcined magnesia. Such calcining is brought about at a temperature of about 1600° to 2200° F. Double pressing procedures can also be used.

The dead burning is carried out at a temperature of at least 3400° F. and can go as high as 4200° F. and higher. The resulting very dense grain then is crushed and graded to the desired range of sizes. A particularly satisfactory sizing is to have 60 percent of it pass a 3 mesh Tyler screen but be retained on a 28 mesh Tyler screen and the remainder be −65 Tyler mesh. The chromic oxide bearing material is then added to the brick mix.

Any other refractory practice can also be used in forming refractory grain in accordance with this invention. A further modification that has been found to give especially good slag resistance is as follows. A mixture of materials bearing MgO and CaO and the chromium oxide yielding compound is prepared and then coburned to provide a dense grain. Thus, the $Cr_2O_3$ is blended more homogeneously throughout the resulting grain than would result by mixing it later in brick batching. The coburning practice can be followed with any of the compositions; especially fine results have been achieved with compositions in which the MgO and CaO are present in about a 9 to 1 ratio.

The invention requires the addition of a chromium material that provides, in the batch, a $Cr_2O_3$ analysis of 1 to 5 weight percent, based on the solids. Consistent with the other requirements as to chemical analysis set forth above, any chromium compound that will yield the requisite $Cr_2O_3$ analysis can be used. Examples of such compounds include chromic oxide, chromic acid, chromium sulfate, such alkali metal dichromates as sodium or potassium dichromate and the like. Of course, chrome ore or other substances with a relatively low $CR_2O_3$ content could not be used because the resulting product would not conform to the chemistry required in the invention.

The chromic oxide yielding compound is added in a particle size that is all finer than 100 Tyler mesh. It could be added as a solution also. Thus, except when it is used in the co-burned grain as noted above, the chromic oxide yielding material is in the matrix portion of the resulting product rather than in the coarse aggregate that is used or distributed throughout the refractory batch in all grain sizing.

As noted, tar or pitch is used as the bonding agent. The use of such material as a bonding agent in preparing brick for this purpose is conventional and usually about 3 to 8 weight percent of pitch, based on the total solids content is used. That practice can be followed in this invention, but preferably the pitch is provided in the manner set forth in the copending application of Ben Davies and Ernest P. Weaver, Serial No. 101,345, filed April 7, 1961, now United States Patent No. 3,070,449. Generally, that involves using 3 to 8 weight percent of a liquefied pitch of medium softening point, say about 150° F., and using about 2 to 12 percent of a powdered solid pitch having a higher softening point than that of the liquefied pitch. Further details of that practice can be found in the aforementioned application.

As illustrative of the advantages to be derived from the present invention, reference may be had to the following examples in which the details are given by way of illustration and not by way of limitation.

In the series of mixes given hereinafter, a high purity dead burned refractory grain of 90 percent MgO and 10 percent CaO was made from lightly calcined sea water magnesite and calcined lime following the practice of the copending application of Leatham et al., Serial No. 40,-181, filed July 1, 1960, now United States Patent 3,060,-042. The analyses of the magnesite and of the lime, on the dead burned basis, are as follows:

|  | Sea Water Magnesia | Lime |
| --- | --- | --- |
| $SiO_2$ | 1.6 | 1.6 |
| $Al_2O_3$ | 0.3 | 0.3 |
| $Fe_2O_3$ | 0.6 | 0.8 |
| CaO | 1.4 | 96.3 |
| MgO | 96.1 | 0.9 |

The dead burned grain was crushed and graded to give two fractions, 60 percent being −3+28 Tyler mesh and the remaining 40 percent all −65 Tyler mesh fraction. In runs 2, 3, and 4, Technical Grade chromic oxide as supplied by the Fisher Scientific Company was substituted for part of the fine fraction. The chromic oxide as used was substantially all finer than 100 Tyler mesh.

The coarse grain material was heated and then blended with a cokeable carbonaceous pitch having a softening point of about 150° F. and which had been liquefied by heating to about 270° F. The fine fraction of the mix, including the chromic oxide where used, was then added to the batch in an unheated condition. The mix was then pressed into 9 x 4½ x 2½ inch brick at 8000 p.s.i. The composition of these brick, as well as property data, as determined by standard ASTM tests, are:

Table I

|  | 1 | 2 | 3 | 4 |
|---|---|---|---|---|
| 90% MgO, 10% CaO grain: |  |  |  |  |
| —3+28 Mesh_____percent__ | 60 | 60 | 60 | 60 |
| —65 Mesh_____do____ | 40 | 39 | 37 | 35 |
| $Cr_2O_3$_____do____ |  | 1 | 3 | 5 |
| Bonding Pitch (Added)_____do____ | 6 | 6 | 6 | 6 |
| Bulk Density, lbs./ft.$^3$_____ | 184 | 187 | 187 | 188 |
| Modulus of Rupture, p.s.i_____ | 1,920 | 2,460 | 2,180 | 2,150 |

To test the slag resistance of these brick, a pocket was drilled into an end of the brick and a compressed cylinder of the high iron oxide late slag, hereinbefore identified and weighing about 0.12 lb., was placed in the pocket. The brick were then heated to 2910° F. in about 3 hours and held at that temperature for about 5 hours. During the heating, the brick were covered with slabs of other refractories to protect them from deleterious oxidation.

The cooled brick were sawed in half through the slag pocket and were examined visually and microscopically. Comparing the results of runs 2, 3, and 4 with those of run 1, it was observed that even the one percent chromic oxide addition made a significant improvement in slag resistance. In the brick containing 3 and 5 percent additions of chromic oxide, the penetration of the high iron slag was on the order of only one-half that of the brick free from chromic oxide. It is thus evident that my discovery of the use of chromic oxide in these compositions is a material improvement in imparting resistance to attack by a late slag to these brick. These data were confirmed in an actual service size test of brick corresponding to run 3, and the brick gave exceptional service life.

In order to demonstrate that the chromic oxide rather than the tar was the component imparting resistance to the late slag, another series of runs was conducted using brick differing from those indicated in conjunction with Table I only in that paraffin wax was used as a temporary bond in place of pitch.

The brick were then burned at 2700° F. This permitted a more conclusive determination of the effect of the chromic oxide additions as the influence of the tar bond would be absent. The tar bond reduces some of the iron oxide in the slag to iron metal which is relatively non-corrosive. The data obtained are:

Table II

|  | 5 | 6 | 7 | 8 |
|---|---|---|---|---|
|  | Percent | Percent | Percent | Percent |
| 90% MgO, 10% CaO Grain: |  |  |  |  |
| —3+28 Mesh_____ | 60 | 60 | 60 | 60 |
| —65 Mesh_____ | 40 | 39 | 37 | 35 |
| $Cr_2O_3$_____ |  | 1 | 3 | 5 |
| Esso Paraffin Wax (Added)_____ | 2 | 2 | 2 | 2 |

The slag test was conducted on these brick. Examination of the slag pocket of mix 5 showed that no slag was retained in the cup while mix 6 showed a measurable amount of slag in the cup. Mixes 7 and 8 retained over a ¼ inch layer of slag in the cup or pocket. Penetration also was deeper in the chrome-free composition, being around ½ inch and in spots even beyond this, whereas the penetration in the brick with 3 percent and 5 percent chromic oxide was generally less than ¼ inch. It is evident that it is the chromic oxide, rather than tar, that accounts for these advantageous results.

The effect of chromic oxide additions on tar bonded dolomite-magnesite compositions was also studied. High purity dead burned dolomite and seawater magnesia were crushed and graded in accordance with standard refractory practice and combined to give a 60:40 mix by weight. The magnesia was all minus 65 mesh. The magnesia had the same analysis as that given in connection with the runs reported in Table I. The analysis of the dead burned dolomite, on a weight basis, was:

| | Percent |
|---|---|
| $SiO_2$ | 0.14 |
| $Al_2O_3$ | 0.25 |
| $Fe_2O_3$ | 0.09 |
| CaO | 57.75 |
| MgO | 41.74 |

A typical screen analysis of the batch was as follows:

| | Percent |
|---|---|
| +4 Tyler mesh | 30 |
| —4+10 | 25 |
| —10+28 | 3 |
| —28+65 | 1 |
| —65 | 41 |

The dolomite, after being heated, was blended with a pitch having a softening point of about 150° F. The fine magnesia was then admixed to the batch in an unheated condition. The batch was then pressed at 8000 p.s.i. into brick 9 x 4½ x 2½ inches at a temperature of 270° F. The data on these brick are:

Table III

|  | 9 | 10 | 11 | 12 |
|---|---|---|---|---|
|  | Percent | Percent | Percent | Percent |
| Dead burned dolomite_____ | 60 | 60 | 60 | 60 |
| Dead burned magnesia_____ | 40 | 39 | 37 | 35 |
| Chromic Oxide_____ |  | 1 | 3 | 5 |
| Bonding pitch (Added)_____ | 5 | 5 | 5 | 5 |

After slag tests identical in character to that noted hereinbefore, visual and microscopic study of the results of slag tests using the high iron oxide late slag showed the significant improvement in resistance to attack brought about through the presence of the chromic oxide.

From the foregoing it can be seen that the addition of a minor amount of chromium, expressed as chromium oxide and added as a fine material, to a magnesia-lime refractory body of specified composition provides exceptional resistance to the late slag generally encountered in the oxygen converter process. Moreover, this result has been achieved without in any manner deleteriously affecting the resistance to the early slag characteristic of the compositions free from the chromic oxide addition, and due, it is believed, to the carbon contributed by the pitch bonding agent and the CaO present in the refractory body. From the data and description, it is further evident that these results can be attained with the techniques and skills presently available in the art.

All percentages are by weight, unless otherwise stated. Further, all terms are used in the manner now understood in the refractory arts. For example, tar or pitch indicate the conventional petroleum base or coal base pitches presently available commercially for bonding purposes.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. That method of preparing refractory shapes for use in contact with basic materials at very high temperatures, comprising forming a mixture of MgO, CaO, and $Cr_2O_3$, the mixture consisting essentially of sufficient of a chromium compound being selected from the group consisting of soluble chromium compounds and —100 mesh technical grade chromic oxide to yield chromic oxide in an amount equal to about 1 to 5%, by weight, of the total batch, MgO in the range 5–94% and CaO in the range 5–50%, the total batch having a solids analysis of at least about 96 weight percent of CaO plus MgO plus $Cr_2O_3$, the MgO and CaO components of said mixture selected from the group consisting of high purity calcined lime, high purity calcined dolomite, and caustic calcined magnesia, said mixture being coburned to a temperature of at least about 2900° F. to produce a dead burned product of high density, the remainder of the mixture consisting of material of the group which analyzes, on an oxide basis, $SiO_2$, $Al_2O_3$, and $Fe_2O_3$, crushing and sizing the dead burned product, mixing said burned product with liquified pitch, and forming shapes from the bath of pitch and burned product.

2. The method of claim 1 in which the mixture is coburned at a temperature of at least about 3400° F.

3. The method of claim 1 in which the $Cr_2O_3$ is in the range of 2 to 4 weight percent, based on the solids mixture.

4. That method of preparing refractory shapes for use in contact with basic materials at very high temperatures, comprising forming a mixture of MgO and CaO, wherein at least 5% is CaO, and where the components of the mixture are selected from the group consisting essentially of high purity calcined lime, high purity calcined dolomite, and caustic calcined magnesia, coburning the resulting mixture to a temperature of at least about 2900° F. to produce a dead burned product of high density, mixing said burned product with a soluble chromium compound in a quantity sufficient to yield 1 to 5 weight percent of $Cr_2O_3$ on an oxide basis, based on the solid content of the resulting batch, the remainder of the batch consisting substantially entirely of material of the group $SiO_2$, $Fe_2O_3$, and $Al_2O_3$, on an oxide basis, mixing the resulting batch with liquified pitch, and forming shapes from the batch of solids and pitch.

5. An unburned refractory brick consisting essentially of, by weight, at least about 96% MgO plus CaO plus $Cr_2O_3$, on the basis of an oxide analysis, the MgO ranging from about 94 to about 50%, the CaO from about 5 to about 50%, and the $Cr_2O_3$ ranging from about 1 to about 5%, the remainder of the brick consisting essentially of $SiO_2$, $Al_2O_3$, and $Fe_2O_3$, on the basis of an oxide analysis, the CaO capable of reacting with constituents of early slag of an oxygen converter process to form dicalcium silicate, the $Cr_2O_3$ being capable of suppressing reaction of brick with iron oxide present in late slag of an oxygen converter process, said brick having been produced by the method of claim 1.

6. An unburned, refractory brick consisting essentially of, by weight, at least about 96% MgO plus CaO plus $Cr_2O_3$, on the basis of an oxide analysis, the MgO ranging from about 94 to about 50%, the CaO from about 5 to about 50%, and the $Cr_2O_3$ ranging from about 1 to about 5%, the remainder of the brick consisting essentially of $SiO_2$, $Al_2O_3$, and $Fe_2O_3$, on the basis of an oxide analysis, the CaO capable of reacting with constituents of early slag of an oxygen converter process to form dicalcium silicate, the $Cr_2O_3$ being capable of suppressing reaction of brick with iron oxide present in late slag of an oxygen converter process, said brick having been produced by the method of claim 4.

References Cited in the file of this patent

UNITED STATES PATENTS

| | | |
|---|---|---|
| 2,943,240 | Martinet | June 28, 1960 |
| 3,023,114 | Becker | Feb. 27, 1962 |

FOREIGN PATENTS

| | | |
|---|---|---|
| 536,302 | Great Britain | May 9, 1941 |
| 713,420 | Great Britain | Aug. 11, 1954 |